(12) United States Patent
Zierke

(10) Patent No.: US 12,508,969 B2
(45) Date of Patent: Dec. 30, 2025

(54) PLATFORM FOR LOADING AND UNLOADING CARGO FROM A TRAILER OR A BED OF A TRUCK

(71) Applicant: Zierke Innovative Industries, LLC, Fairmont, MN (US)

(72) Inventor: Kyle Zierke, Fairmont, MN (US)

(73) Assignee: ZIERKE INNOVATIVE INDUSTRIES, LLC, Fairmont, MN (US)

( * ) Notice: Subject to any disclaimer, the term of this patent is extended or adjusted under 35 U.S.C. 154(b) by 589 days.

(21) Appl. No.: 17/893,713

(22) Filed: Aug. 23, 2022

(65) Prior Publication Data
US 2023/0067153 A1 Mar. 2, 2023

Related U.S. Application Data

(60) Provisional application No. 63/236,427, filed on Aug. 24, 2021.

(51) Int. Cl.
*B60P 1/43* (2006.01)
*B60P 1/02* (2006.01)
(Continued)

(52) U.S. Cl.
CPC ............... *B60P 1/022* (2013.01); *B60P 1/43* (2013.01); *A61G 3/061* (2013.01); *B60P 1/431* (2013.01);
(Continued)

(58) Field of Classification Search
CPC .. B60P 1/43; B60P 1/433; B60P 1/431; B60P 1/435; B60P 1/022; B65G 69/30; A61G 3/061; A61G 3/067
(Continued)

(56) References Cited

U.S. PATENT DOCUMENTS 3,031,214 A * 4/1962 Horne ................... B65G 37/00
403/57
3,086,669 A * 4/1963 Rogers ................. B61D 47/005
410/1
(Continued)

FOREIGN PATENT DOCUMENTS

CN 215553141 U * 1/2022

OTHER PUBLICATIONS

Transport Device for Motor Vehicles; Document ID: EP 3932736 A1; Date Published: Jan. 5, 2022; Inventor: Schöpfer Hans; Application No. EP 20182994 A; Date Filed: Jun. 29, 2020 (Year: 2022).*

*Primary Examiner* — Mahdi H Nejad
(74) *Attorney, Agent, or Firm* — Westman, Champlin & Koehler, P.A.

(57) ABSTRACT

An onboard platform for loading cargo into and unloading cargo from a trailer includes a first portion comprising a plurality of beams secured together. The first portion is configured to provide stability and rigidity to the platform. The onboard platform also includes a second portion comprising a turntable rotatably attached to the first portion proximate a center point of the turntable, the turntable configured to move about the rotational attachment in a selected range of degrees relative to the first portion. The onboard platform is configured to move between in a first position where the platform is stowed below a bed of the trailer and a second position where the platform extends from an edge of the bed of the trailer and is secured into the second position to aid in loading cargo into and unloading cargo from the trailer.

18 Claims, 6 Drawing Sheets

(51) Int. Cl.
  *B65G 69/30* (2006.01)
  *A61G 3/06* (2006.01)

(52) U.S. Cl.
  CPC ............. *B60P 1/433* (2013.01); *B60P 1/435* (2013.01); *B65G 69/30* (2013.01)

(58) Field of Classification Search
  USPC ............................. 414/537; 14/69.5; 254/88
  See application file for complete search history.

(56) References Cited

U.S. PATENT DOCUMENTS

| | | | |
|---|---|---|---|
| 3,185,109 A * | 5/1965 | Mengel | B60S 13/02 |
| | | | 104/45 |
| 5,090,335 A * | 2/1992 | Russell | B60P 1/433 |
| | | | 224/403 |
| 7,144,040 B2 * | 12/2006 | Kiehl | B62D 21/02 |
| | | | 296/205 |
| 7,472,485 B2 * | 1/2009 | Gray | G01B 5/255 |
| | | | 33/203.14 |
| 8,266,750 B2 * | 9/2012 | Peterson | E01D 18/00 |
| | | | 14/72.5 |
| 8,413,280 B2 * | 4/2013 | Goin | B60P 1/431 |
| | | | 14/71.1 |
| 9,517,713 B2 * | 12/2016 | Honigsberg | B60P 3/07 |
| 9,694,997 B2 * | 7/2017 | Lopez | B60P 1/43 |
| 10,807,814 B2 | 10/2020 | Lopez | |
| 11,932,157 B2 * | 3/2024 | O'Brien | B60P 1/43 |
| 2004/0226116 A1 * | 11/2004 | O'Donnell | B60P 1/431 |
| | | | 14/69.5 |
| 2012/0097818 A1 * | 4/2012 | Desmarais | A47B 91/12 |
| | | | 248/345.1 |
| 2012/0204363 A1 * | 8/2012 | Westermark | B63B 27/143 |
| | | | 14/71.3 |
| 2016/0144759 A1 * | 5/2016 | DiBlasio | B60P 1/435 |
| | | | 414/537 |
| 2018/0118477 A1 * | 5/2018 | Deshpande | B65G 69/30 |
| 2021/0070562 A1 | 3/2021 | Lopez | |
| 2022/0241121 A1 * | 8/2022 | Bartos | A61G 3/067 |

* cited by examiner

PLATFORM FOR LOADING AND UNLOADING CARGO FROM A TRAILER OR A BED OF A TRUCK

CROSS REFERENCE TO RELATED APPLICATION(S)

The present application claims the benefit of U.S. Provisional Patent Application Ser. No. 63/236,427 entitled PLATFORM FOR LOADING AND UNLOADING CARGO FROM A TRAILER that was filed on Aug. 24, 2021, the contents of which are incorporated by reference in its entirety.

BACKGROUND

The present disclosure relates to a platform for loading cargo into and unloading cargo out of a trailer or a bed of a truck. More particularly, the present disclosure relates to a platform secured to a trailer or a bed of a truck with a rotating turntable for loading and unload cargo.

Many vehicles, such as semi-trailers and box trucks, are used to deliver goods in locations where access to the delivery site can be limited and challenging, especially for larger vehicles. In many instances, the delivery site does not have loading and unloading docks, and requires use of a street and/or a sidewalk to manually deliver the cargo or goods. When the delivery site is blocked by vehicles or other obstacles, the worker is required to either double park or move a distance from the location and transport the goods a larger distance.

In many instances, a delivery to a site without loading and unloading docks requires one or more workers to carry the cargo to the edge of trailer proximate a door, typically located on a side or back end of trailer. The cargo is then typically manually lowered to the ground or sidewalk, where a curb typically is required to be navigated. Once on the ground or sidewalk, the goods are then manually carried to the site or a dolly is used to deliver the goods. However, this process is manual labor intensive and time consuming.

There is a need to provide cargo trucks and semi-truck trailers with the ability to load and unload cargo when loading docks are unavailable and where cargo is loaded and unloaded to street level. There is also a need to provide cargo trucks and semi-truck trailers with the ability to load and unload cargo at different angles to be able to compensate for unexpected obstacles or parked vehicles.

SUMMARY

An aspect of the present disclosure is directed to an onboard platform for loading cargo into and unloading cargo from a trailer. The onboard platform includes a first portion comprising a plurality of beams secured together. The first portion is configured to provide stability and rigidity to the platform. The onboard platform also includes a second portion comprising a turntable rotatably attached to the first portion proximate a center point of the turntable, the turntable configured to move about the rotational attachment in a selected range of degrees relative to the first portion. The onboard platform is configured to move between in a first position where the platform is stowed below a bed of the trailer and a second position where the platform extends from an edge of the bed of the trailer and is secured into the second position to aid in loading cargo into and unloading cargo from the trailer.

Another aspect of the present disclosure relates to an onboard platform for loading cargo into and unloading cargo from a trailer. The onboard platform includes a first portion comprising a plurality of beams secured together, where the first portion configured to provide stability and rigidity to the platform and distal ends of the beams form angled surfaces that are mirror images of each other. The onboard platform includes a second portion comprising a turntable rotatably attached to the first portion proximate a center point of the turntable. The turntable is configured to move about the rotational attachment in a selected range of degrees relative to the first portion wherein the selected range of degrees is determined by the angles of the surfaces of the distal ends. The onboard platform is configured to be positioned between a first position and a second position. When the platform is in a first position the platform is stowed below a bed of the trailer and wherein when the platform is in the second position, the platform extends from an edge of the bed of the trailer and is secured into the second position to aid in loading cargo into and unloading cargo from the trailer.

DETAILED DESCRIPTION

Figure 1:
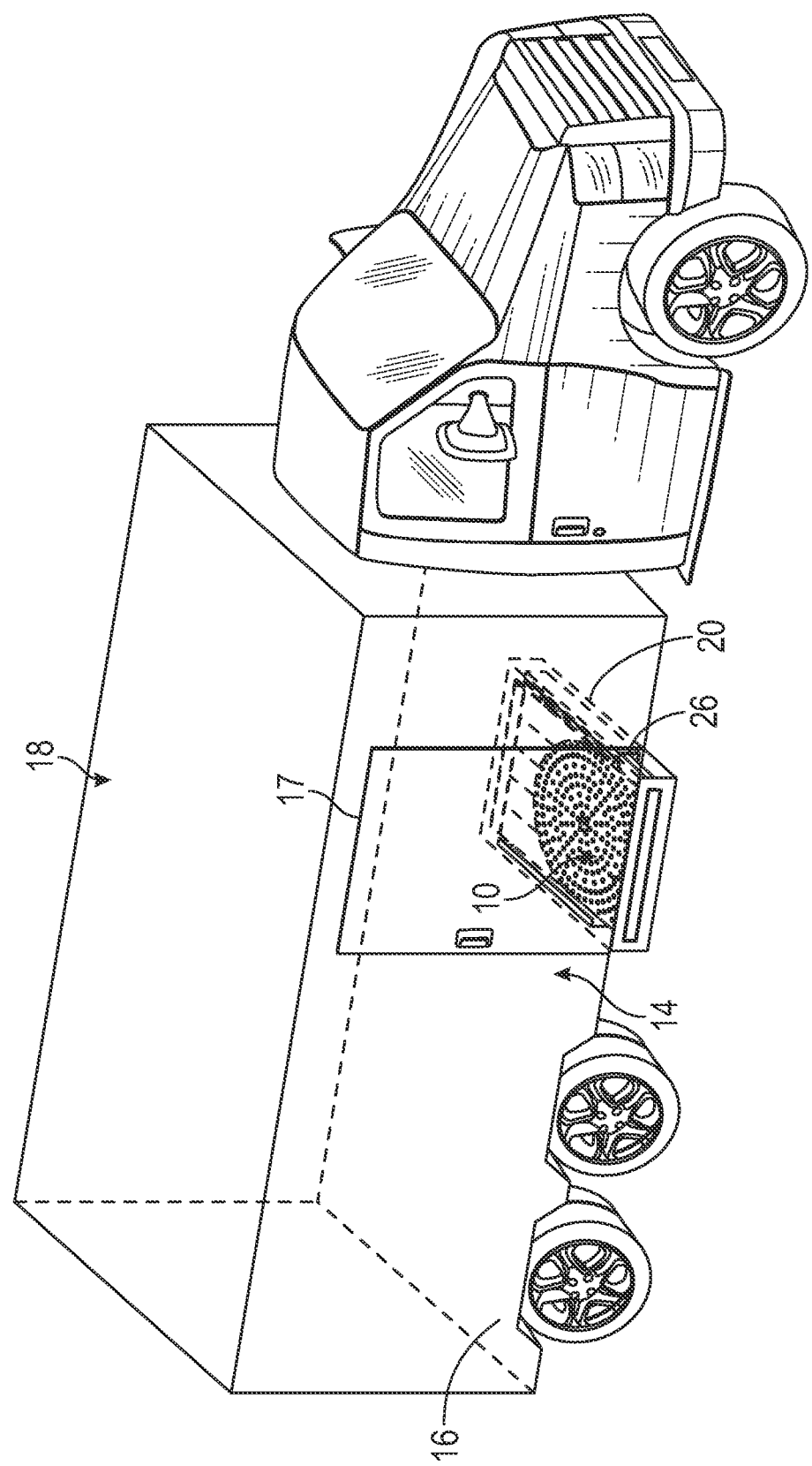
FIG. 1 is a schematic view of a trailer with an onboard platform in a first, stowed position.

An onboard loading and unloading platform for use with a cargo truck or semi-truck trailer is illustrated in FIG. 1 at 10. The onboard platform 10 allows a person to load cargo onto and unload cargo from a trailer or bed onto a sidewalk or street level at different angles. The onboard platform 10 allows the user to navigate obstacles, such as parked cars, snow drifts and standing water while being able to off load cargo from the bed or trailer.

Figure 2:
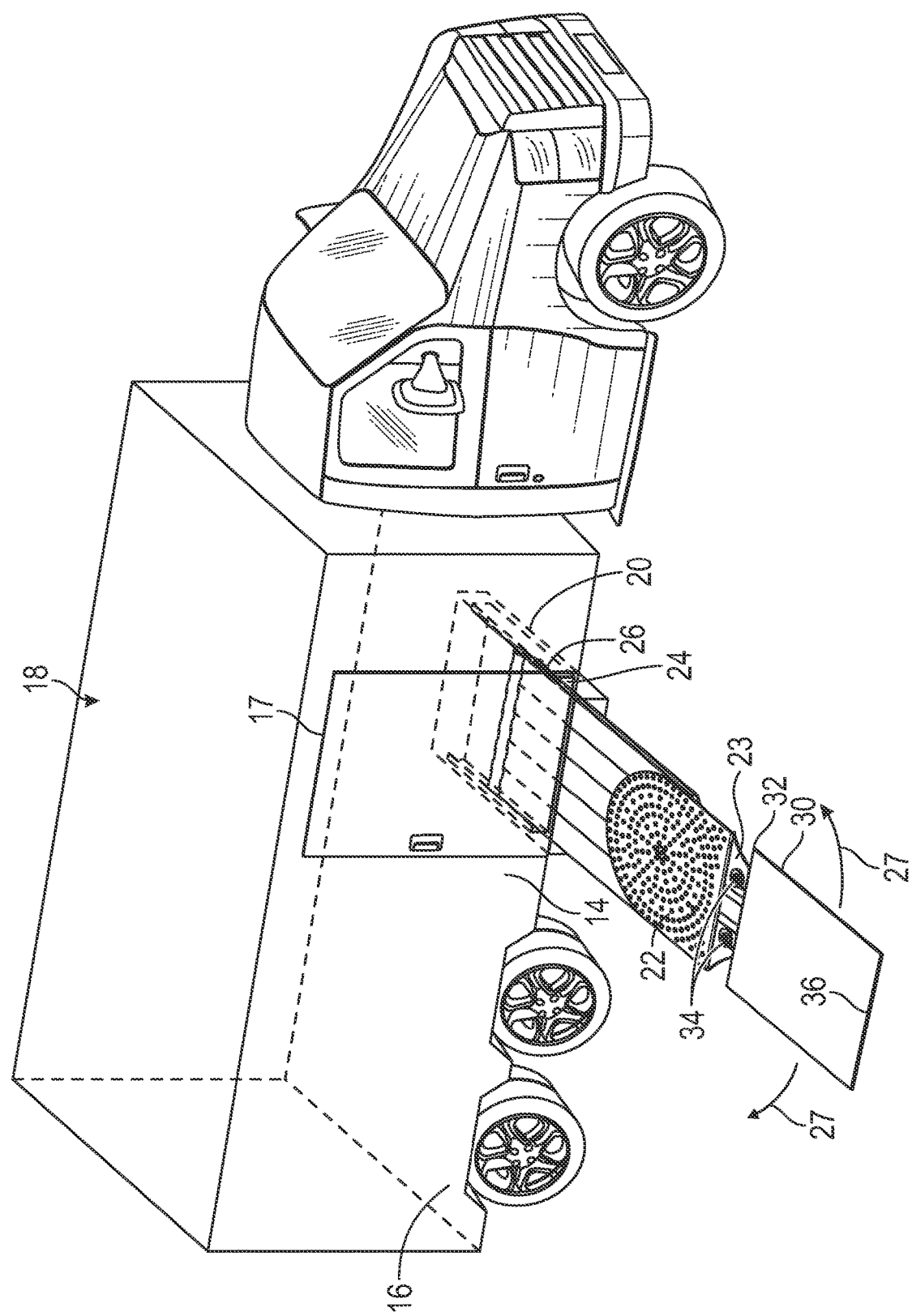
FIG. 2 is a schematic view of the trailer with the onboard platform in a second, extended position.
Figure 3:
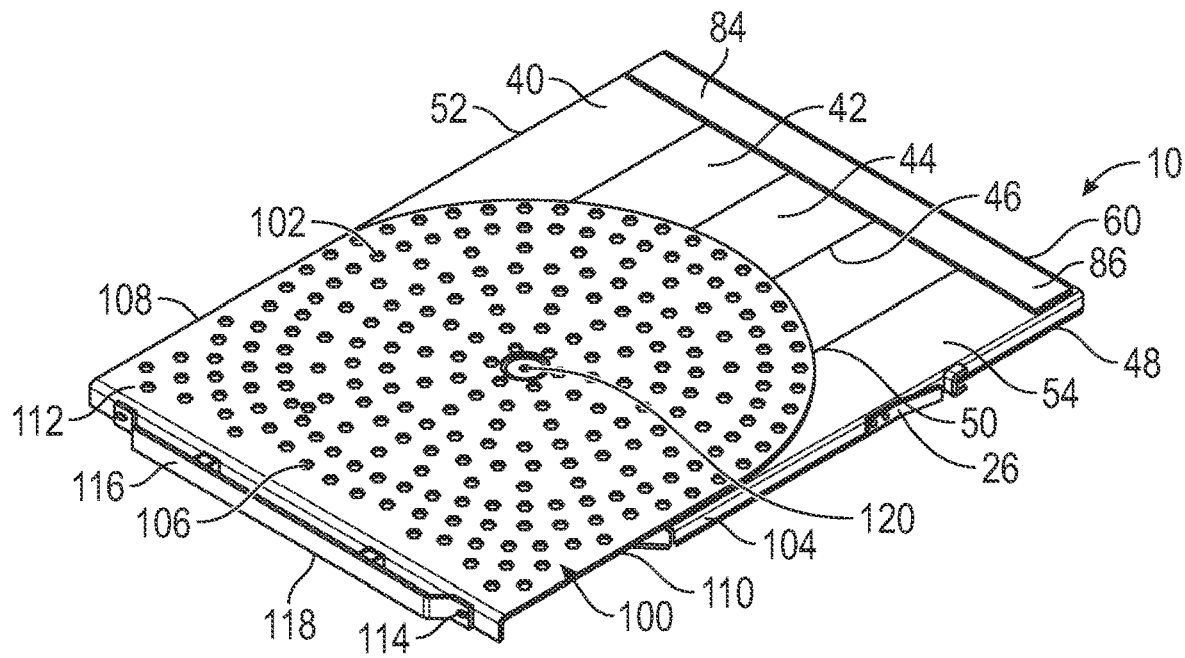
FIG. 3 is a perspective view of the platform.
Figure 4:
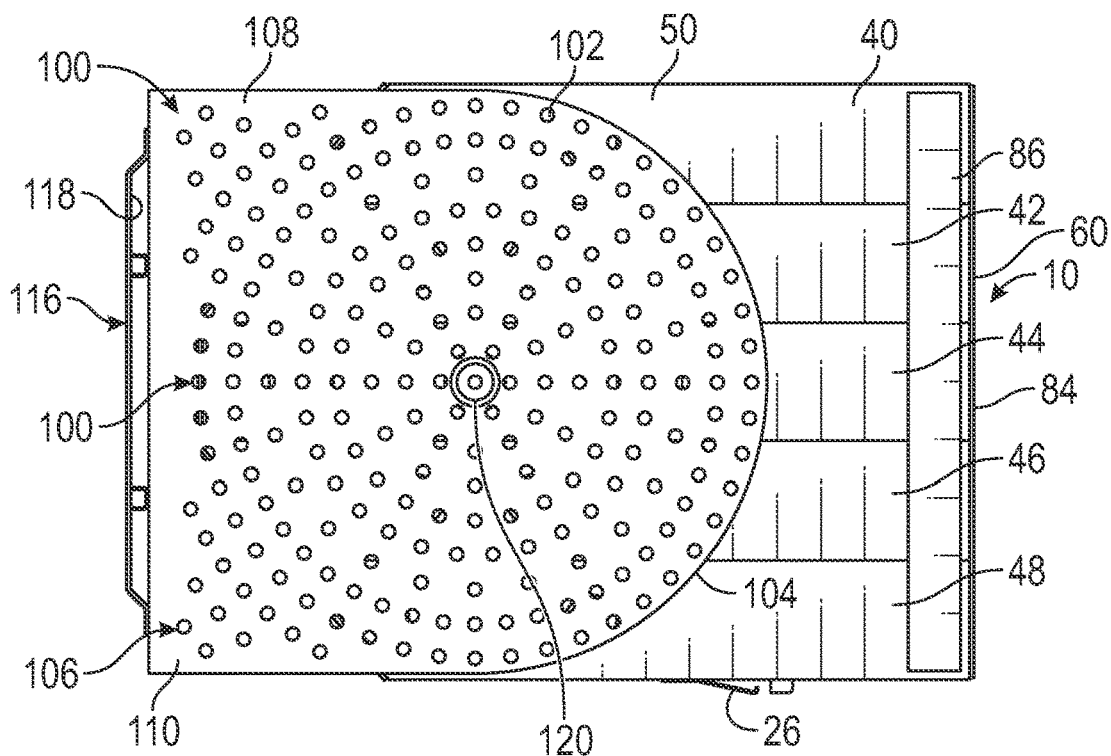
FIG. 4 is a top view of the platform.
Figure 5:
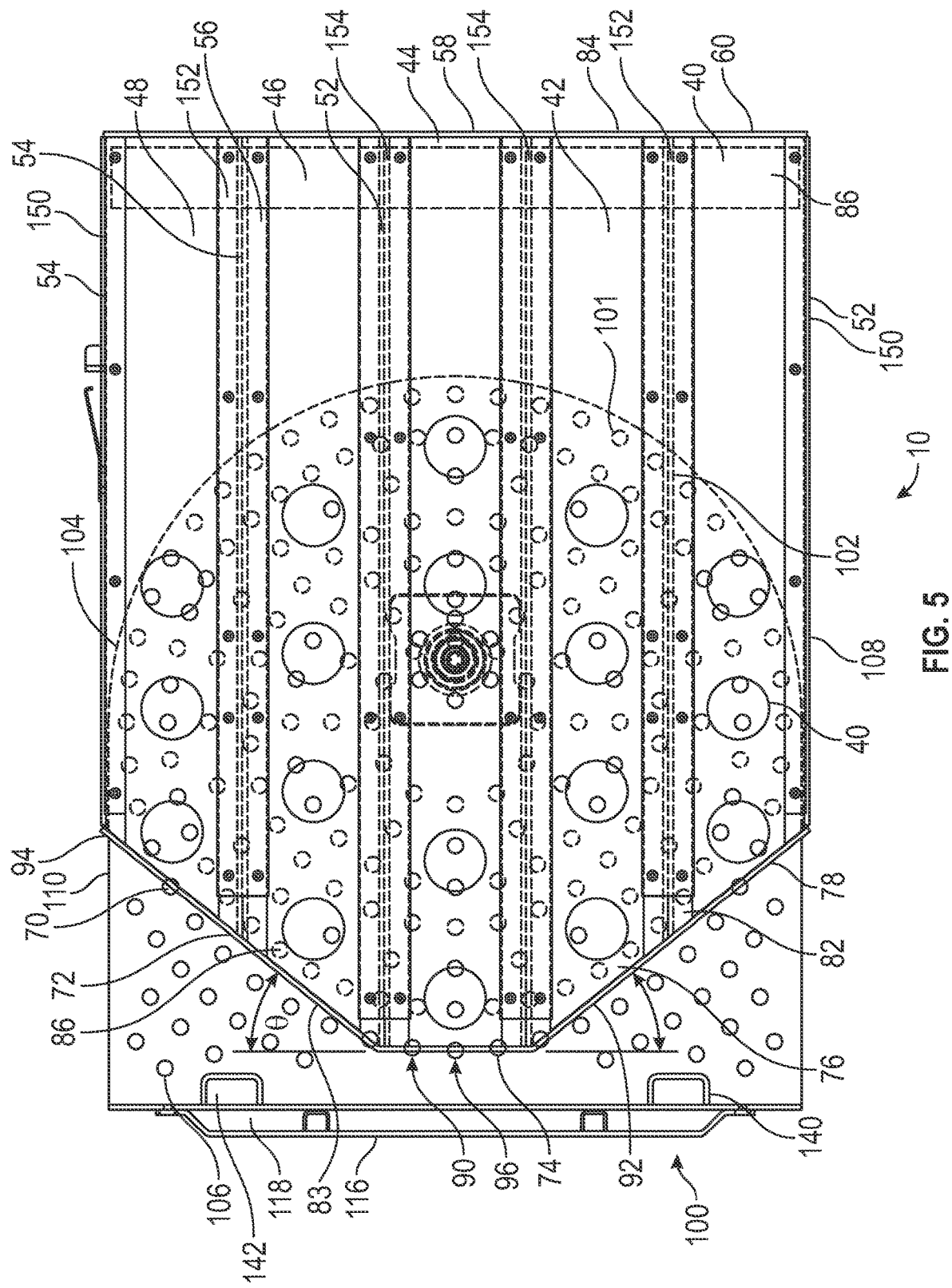
FIG. 5 is a bottom view of the platform.
Figure 6:
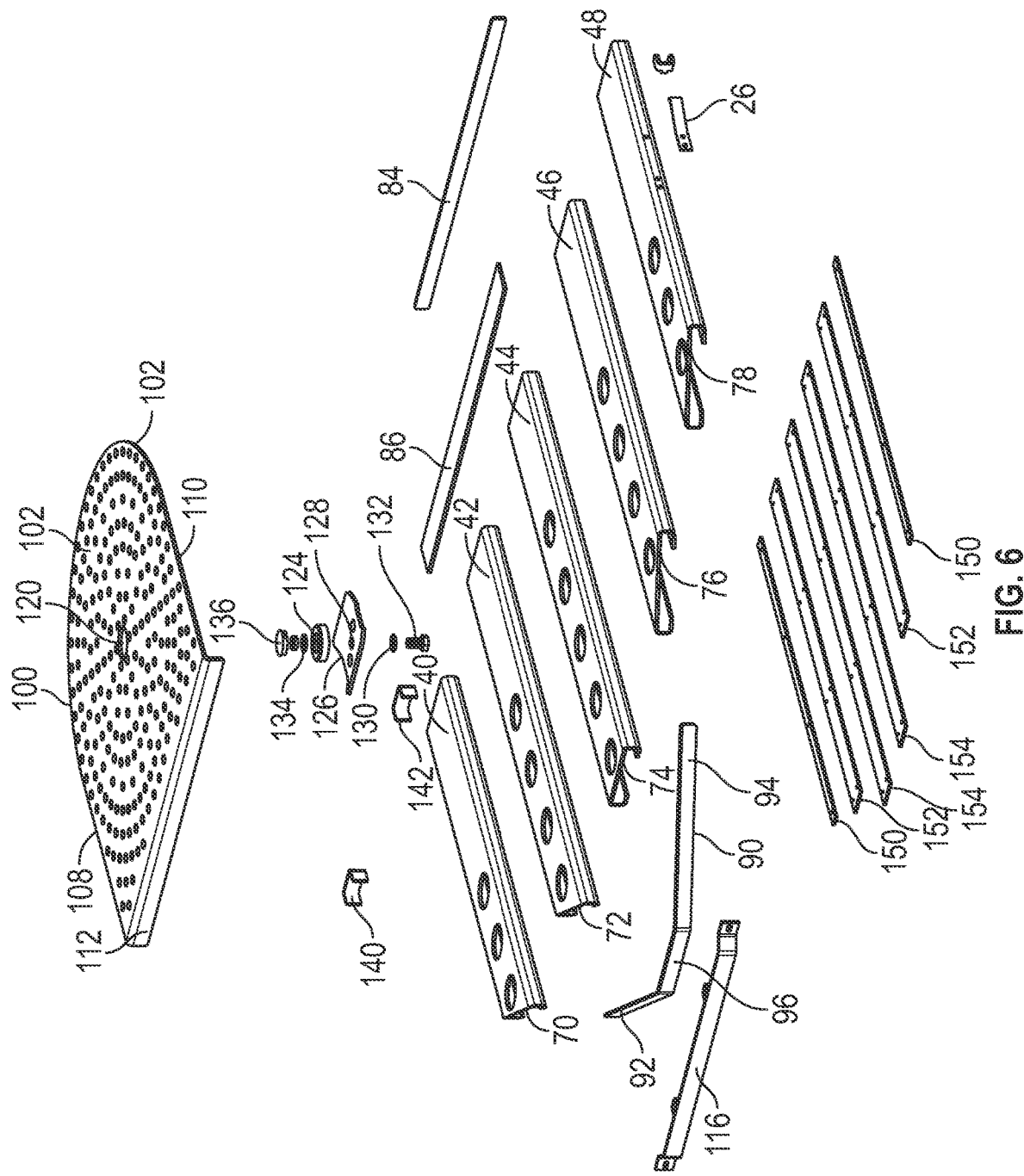
FIG. 6 is an exploded view of the platform.

The platform 10 is configured to be positioned into a first, stowed position below a decking 14 of the bed 16 of the box or trailer 18 in a carriage 20 mounted below the decking 14 or within a frame for the trailer 18 as illustrated in FIG. 1. The platform 10 is then pulled from the carriage 20 into a second, extended position where the platform 10 to extend beyond an edge of the bed 16 and below an opening in the box 17 until a spring latch 24 biases into an aperture 26 in the carriage 20 to fix the lateral location of the platform 10 relative to the carriage 20 as illustrated in FIG. 2. With the lateral location of the platform 10 fixed relative the carriage 20, cargo can be unloaded from and loaded into the box or trailer 18. When in the second position, the platform 10 is substantially rigid and has minimal vertical movement due to the design of the platform 10 and the materials used to construct the platform 10. The platform 10 includes a stop 27 proximate the latch that prevents the To return the platform 10 to the first, stowed position, the spring latch 24 is depressed with manual force and then the platform 10 can be pushed into the carriage 20.

Figure 7:
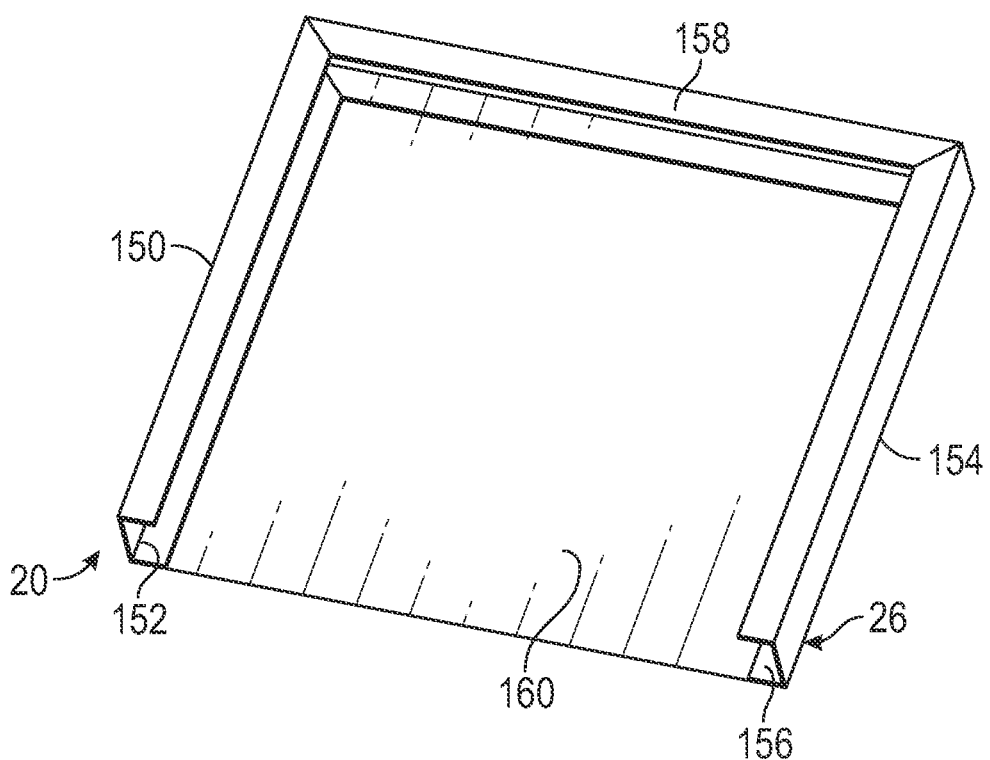
FIG. 7 is a view of the carriage for the platform.

Referring to FIG. 7, the carriage 20 includes a left C shaped beam 150 having a channel 152 extend a length thereof. The carriage includes a rights C shaped beam 154 also having a channel 156 extending a length thereof. A back beam 158 attaches to distal ends of the spaced a apart left and right C shaped beams 150 and 154 and provides a stop for the platform 10 when in the first, stowed position. The carriage 20 includes a floor 160 that spans the space between the left, right and back beams 150, 154 and 158 where the channels 152 and 156 of the left and right beams 150 and 154 and the floor 160 define an opening 162 through which the platform 10 moves between the first, stowed position and the second, extended position. The left and right beams 150 and 154 are spaced to limit side to side movement of the of the platform 10 within the carriage while allowing the platform 10 to move between the first, stowed position and the second, extended position.

Referring back to FIG. 2, with the platform 10 in the second, extended position, a ramp 30 can be attached to a turntable 22 of the platform 10 by positioning a plurality of pegs 34 located at a proximal end 32 of the ramp 30 into spaces 23 in a handle 21 attached to the turntable 22. The ramp 30 is used as a lever to rotate the turntable 22 and adjust an angle of the ramp 30 relative to the platform 10 and place the ramp 30 in a selected position as indicated by arrows 27. Once a distal end 36 the ramp 30 is in a selected position relative to the is engaging ground level, cargo can be loaded and unloaded using the platform 10 and the ramp 30. An alternative for loading and unloading cargo is to position the platform 10 in the second extended position place the cargo on the platform 10 proximate the extended end such that the cargo can be grabbed and moved to ground level by a person.

Referring to FIGS. 3-6, the platform 10 includes a left end beam 40, a left middle beam 42, a center beam 44, a right middle beam 46 and a right end beam 48. The beams 40-48 have "C" shaped cross-section with a substantially flat, horizontal portion 50 with left and right side portions 52 and 54 that are substantially normal to the substantially flat, horizontal portion and left and right ribs 56 and 58 that are substantially normal to the left and right side portions 52 and 52 and substantially parallel to the substantially flat, horizontal portion 50. The beam 40-48 are positioned side by side where a left side portion 52 of one beam abuts a right side portion 54 of another beam where a distal end 60 of each beam 40-48 are aligned. The adjacent beams are secured together, typically with a weld, rivets and/or nuts and bolts. However, other securing mechanisms are also with the scope of the present disclosure.

The left and right end beams 40 and 48 are mirror images of each other and include angled proximal ends 70 and 78. Similarly, the left and right middle beams 42 and 46 are mirror images of each other and include angled proximal ends 72 and 76, where the middle beams are longer than the end beams 70 and 78, such that continuous angled edges 80 and 82 are formed when the beams 40 and 42 and 46 and 48 are secured together. The middle beam 44 has a substantially straight proximal end 74 that is aligned with the edges 80 and 82 to form a substantially continuous proximal end 83. The angles range from about 30° to about 60° and more typically from about 40° to about 50° and even more typically about 45°.

A vertical plate 84 is positioned across a width of the platform 10 and is attached to the distal ends 60 of the beams 40-48. The vertical plate 84 covers the openings at the distal end 60 of the beams 40-48 and provides structural integrity and rigidity to the platform.

A top plate 86 is position across the substantially flat, horizontal portions 50 of the beams 40-48 and substantially spans the width of the platform 10. The top plate 86 is attached to the beams 40-48 to connect the beams 40-48 together, which provides structural integrity and rigidity to the platform 10.

A front plate 90 has a complementary configuration to the proximal end 83 of the beams 40-48. The front plate 90 has a left angled portion 92 and a right angled portion 94 that are connected with a middle portion 96. The front plate 90 covers the front openings of the beams 40-48 and connect the beams 40-48 together at the proximal end, which provides rigidity and structural integrity to the platform.

The vertical plate 84, the top plate 86 and the front plate 90 are attached to the beams 40-48 with any suitable securing mechanisms, including but not limited to, rivets, bolts with nuts, welds and utilizing bolts with threaded bores.

The platform 10 includes a turntable 100 that has a back portion 102 with a semi-circular perimeter 104 and a front portion 106 with substantially straight, parallel side edges 108, 110 and a front edge 112 that is substantially perpendicular to the side edges 108, 110. A substantially vertical portion 114 extends from the front edge 112 to aid in providing rigidity to the turntable 100.

By way of non-limiting example, the turntable 100 and the beams 40-48 are formed of 0.25 inch-thick aluminum. The aluminum provides sufficient rigidity while being lighter in weight than steel. However, the platform can be constructed of any suitable material.

A ramp bracket or handle 116 is attached to the vertical portion 114 and provides slots or spaces 118 for attaching the ramp 30 to the turntable 110, as discussed above. The ramp bracket or handle 116

The turntable 100 includes an aperture 120 at the centerpoint of a diameter of the semi-circular back portion 102 that is aligned with an aperture 122 in the middle beam 44. A plate 126 is welded to a bottom side 43 of the middle beam 44, where the plate 126 includes a through bore 128. A spacer 124 is positioned with in the aperture 120 which is aligned with the through bore 128 in the plate 126 through the aperture 122 in the middle beam 44. A washer 130 is positioned over a bolt 132 and the bolt 132 is inserted through the apertures 120, 122 and 128. A washer 134 is positioned over a threaded end 133 of the bolt 132 and a cap 136 with a threaded bore threadably engages the bolt 132 to retain the turn table 110 to the beams 40-48. While the threaded engagement to rotatably secure the turntable 100 the platform 10 is disclosed, any suitable attaching mechanism that rotatably retains the turntable 100 to the platform 10 is within the scope of the present disclosure.

The turntable 100 includes spaced apart bumpers 140 and 142 attached to the vertical portion 116. As the turntable 100 is rotated relative to the beams 40-48, the rotational range of motion of turntable 100 is limited by the engagement of the bumper 140 with the left angled portion 92 of the front plate 90 and the engagement of the bumper 142 with the right angled portion 94 of the front plate. As illustrated the ends 70, 72, 76 and 78 are at about a 45° angle θ which provides about a 90° range of motion from when the bumpers 140 and 142 engage the left and right-angled portions 92 and 94 of the front plate 90. The range of rotational motion of the turntable 100 relative to the beams 40-48 can be adjusted by changing the angle of the proximal ends 70-78 of the beams 40-48, respectively. When the angles θ range from about 30° to about 60°, the range of motion ranges from about 60° to about 120° and the angles θ range from about 40° to about 50° the range of motion of the turntable 100 ranges from about 80° and 100°.

The platform includes a plurality of polytetrafluoroethylene (PTFE) strips 150 that are sized to be attached to the outside ribs 52 and 54 on the outer left and right beams 40 and 48. PTFE strips 152 are sized to attach to the adjacent ribs 52 and 54 the outer and middle left and right beams 40, 42, 46 and 48, respectively. PTFE strips 154 are sized to attach to the adjacent ribs 52 and 54 the middle left and right beams 46 and 48 and the center beam 44. The PTFE strips 150, 152 and 154 provide a low surface energy material that aids is sliding the platform 10 within the carriage 20 from the first position as illustrated in FIG. 1 to the second position as illustrated in FIG. 2 and back to the first position. The PTFE strips 150 typically include countersunk bores that allow the strips 150 to be riveted to the ribs 52 and 54 while the rivet heads are even with or within the countersunk portion of the bores, such that the rivet heads clear the bottom surface of the carriage 20. While PTFE is disclosed, any material that aids in sliding the platform 10 within the carriage 20 is within the scope of the present disclosure.

The beams 40-48 include a plurality of apertures 49 that are positioned below the back portion 102 of the turntable 100. The turntable 100 includes a plurality of apertures 101 along the front and back portions 102 and 106. As the turntable rotates 100 the apertures 101 move over the apertures 49 which allows collected debris to be removed from the platform 100. Removing the debris between the turntable 100 and the beams 40-48 aids in maintaining the free movement of the turntable 100 relative to the beams 40-48.

Although the present disclosure may have been described with reference to preferred embodiments, workers skilled in the art will recognize that changes may be made in form and detail without departing from the spirit and scope of the disclosure.

The invention claimed is:

1. An onboard platform for loading cargo into and unloading cargo from a trailer, the onboard platform comprising:
a first portion comprising a plurality of beams secured together, the first portion configured to provide stability and rigidity to the platform, wherein each of the plurality of beams have holes therein; and
a turntable comprises a plurality of apertures therein, the turntable comprising:
an inner portion having a semi-circular portion; and
an outer portion having substantially parallel edges and a distal edge that is substantially normal to the parallel edges, wherein the turntable is rotatably attached to the first portion proximate a center point of a diameter of the semi-circular portion, the turntable configured to rotate about a rotational attachment in a selected range of degrees relative to the first portion, wherein as the turntable is rotated debris between the frist protion and the turntable is able to be discharged through the plurality of holes in each beam of the plurality of beams, wherein when the onboard paltform is in a first position the platform is stowed below a bed of the trailer and wherein when in a second position, the platform extends from an edge of the bed of the trailer and is secured into the second position to aid in loading cargo into and unloading cargo from the trailer.

2. The onboard platform of claim 1 and further comprising a spring latch attached to an outer side edge of the plurality of beams, the spring latch configured to engage an aperture in a carriage to secure the platform in the second position.

3. The onboard platform of claim 1 and further comprising a ramp configured to engage the turntable, wherein the ramp is configured to engage and rotate the turntable within the selected range of degrees of motion to place the ramp in a selected position at ground level.

4. The onboard platform of claim 3, wherein the turntable comprises a handle attached to a distal end of the turntable, the handle and the distal end defining one or more slots therein.

5. The onboard platform of claim 1 wherein each of the plurality of beams has a "C" shaped cross-section.

6. The onboard platform of claim 1, wherein the plurality of beams comprises a plurality of outer beams, a distal end of each outer beam of the plurality of outer beams comprises an angle that slopes from a lontitudinal axis of the first portion and towards the trailer when in the second position.

7. The onboard platform of claim 6, wherein the turntable comprises spaced apart bumpers configured to abut a surface passing by the distal ends of the plurality of beams to define the selected range of degrees of motion of the turntable relative to the first portion.

8. The onboard platform of claim 1 and further comprising a plurality of polytetrafluoroethylene strips configured to be attached to bottom surfaces of the plurality of outer beams.

9. The onboard platform of claim 1, wherein the selected range of degrees ranges from about 60° to about 120°.

10. The onboard platform of claim 1, wherein the selected range of degrees ranges from about 80° to about 100°.

11. An onboard platform for loading cargo into and unloading cargo from a trailer, the onboard platform comprising:
a first portion comprising a plurality of beams secured together, the first portion configured to provide stability and rigidity to the platform, wherein distal ends of outer beams of the plurality of beams form two angles surfaces that are mirror images of each other; and
a turntable comprising:
an inner portion having a semi-circular portion that aids in rotating the turntable relative to the plurality of beams; and
an outer portion having substantially parallel edges and a distal edge that is substantially normal to the parallel edges, wherein the turntable is rotatably attached to the first portion proximate a center point of a diameter of the semi-circular portion, wherein the turntable configured to rotate about a rotational attachment in a selected range of degrees relative to the first portion wherein selected range of degrees is determined by the angled surfaces of the surfaces of the distal ends, wherein when the onboard platform is in a first position the platform is stowed below a bed of the trailer and wherein when in a second position, the platform extends from an edge of the bed of the trailer and is secured into the second position to aid in loading cargo into and unloading cargo from the trailer.

12. The onboard platform of claim 11 and further comprising a spring latch attached to an outer side edge of the plurality of beams, the spring latch configured to engage an aperture in a carriage to secure the platform in the second position.

13. The onboard platform of claim 11 and further comprising a ramp configured to engage the turntable, wherein the ramp is configured to engage and rotate the turntable with the selected range of degrees of motion to place the ramp in a selected position at ground level.

14. The onboard platform of claim 11, wherein the turntable comprises a handle attached to a distal end of the turntable, the handle and the distal end defining one or more slots therein.

15. The onboard platform of claim 11 wherein each of the plurality of beams has a "C" shaped cross-section.

16. The onboard platform of claim 11, wherein the turntable comprises spaced apart bumpers configured to abut a surface passing by the angled surfaces at the distal ends of the plurality of outer beams.

17. The onboard platform of claim 11, wherein the selected range of degrees ranges from about 60° to about 120°.

18. The onboard platform of claim 11, wherein the selected range of degrees ranges from about 80° to about 100°.

* * * * *